Feb. 4, 1958   J. WALKER   2,822,328
BIFURCATED SELF-BAKING ANODE AND GAS COLLECTION MEANS
Filed July 20, 1953   5 Sheets-Sheet 1

Inventor
JOHN WALKER.
By James E. Tooney
Attorney

Feb. 4, 1958  J. WALKER  2,822,328
BIFURCATED SELF-BAKING ANODE AND GAS COLLECTION MEANS
Filed July 20, 1953  5 Sheets-Sheet 2

Inventor
JOHN WALKER.
By James E. Toomey
Attorney

Feb. 4, 1958  J. WALKER  2,822,328
BIFURCATED SELF-BAKING ANODE AND GAS COLLECTION MEANS
Filed July 20, 1953  5 Sheets-Sheet 4

INVENTOR
JOHN WALKER.

BY *James E. Tooney*

ATTORNEY

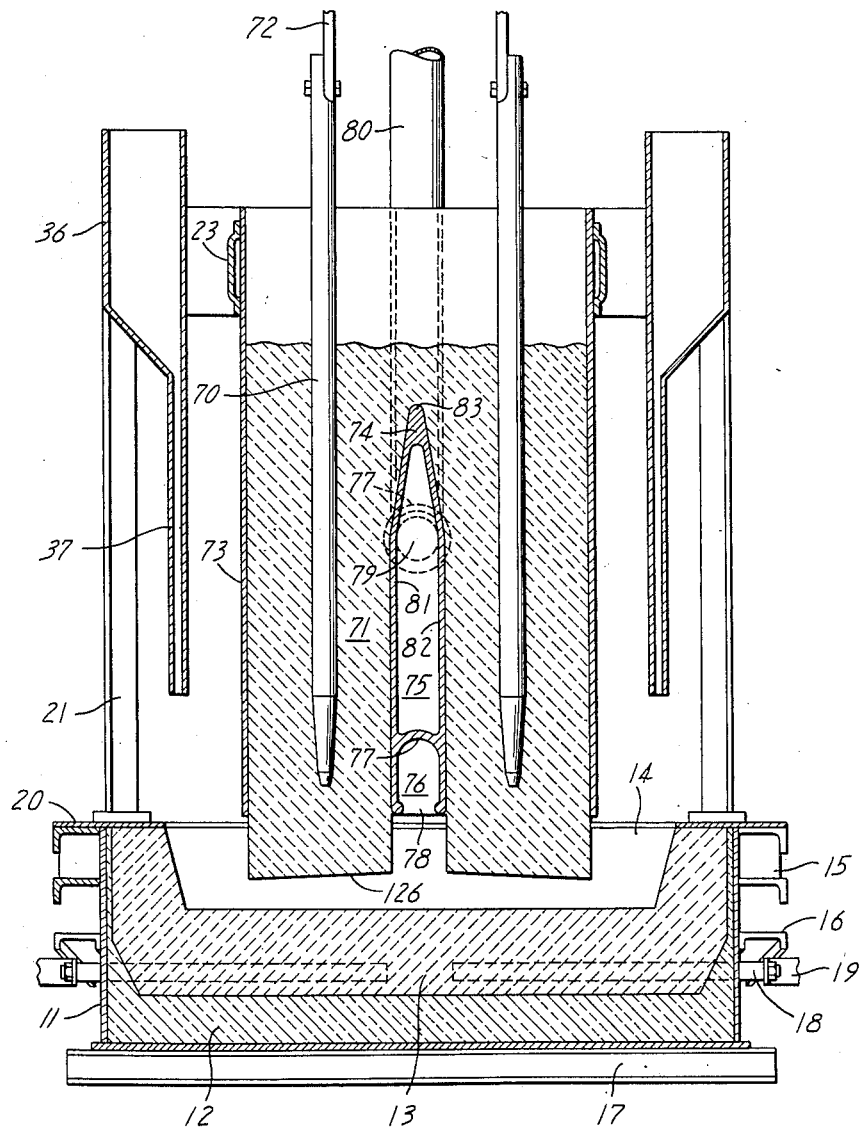

United States Patent Office 2,822,328
Patented Feb. 4, 1958

2,822,328

BIFURCATED SELF-BAKING ANODE AND GAS COLLECTION MEANS

John Walker, Walnut Creek, Calif., assignor to Henry J. Kaiser Company, Oakland, Calif., a corporation of Nevada Application July 20, 1953, Serial No. 369,205

5 Claims. (Cl. 204—247)

This invention relates to electric furnaces employing electrodes of the continuous or self-baking type, and more particularly relates to an improved electric furnace self-baking anode structure and casing therefor wherein provision is made for efficient recovery of gases and vapors generated incidental to the operation of the furnace. In a specific embodiment this invention relates to a method of and apparatus for efficient collection of gases containing elemental or combined fluorine generated during the electrolytic production of aluminum from alumina.

In the electrolytic reduction process commercially employed for production of aluminum, alumina is dissolved in a fused cryolite or equivalent melt and is reduced by electrolytic action of the furnace, the pure metal collecting in the bottom of the cathode cavity of the furnace and the released oxygen combining with the carbon of the anode and reacting to form a mixture of CO and $CO_2$. Other gases, consisting of fluorine compounds generated by the decomposition of the fused cryolite melt, are also being continuously produced during the operation of the furnace, these gases being hereinafter referred to collectively as anode gases in the interest of brevity.

Also, in the self-baking type of anode, tar vapors are being generated continuously by the cracking of the volatiles in the anode paste mixture, and these vapors must be released from the top of the anode housing.

The soluble forms of fluorine contained in these anode gases are highly acidic and quite toxic to both animal and vegetable life. Deposition of waste gases and accumulation of such forms of fluorine in surrounding areas have in the past caused serious damage to cattle ingesting the same, and have also injured plants extensively. In addition, the loss of the fluorine-containing values from the cryolite of the bath may be quite substantial and entails continued replenishment with fresh fluorine-containing bath values. Moreover, if these fluorine-containing anode gases are allowed to escape into the customary enclosure housing a large number of furnaces, such gases soon give rise to a condition which not only makes working conditions untenable from a standpoint of comfort and visibility, but also constitutes a hazard to the health of the furnace operators.

Thus, it has become well recognized that an essential feature in the operation of aluminum reduction furnaces is the control and ultimate disposal of these generated anode gases.

Heretofore several means have been proposed for collecting such anode gases. In conjunction with furnaces employing self-baking anodes utilizing vertical contact studs, methods of collecting the anode gases have been adopted which incorporate inverted channel structures surrounding the anode casing at its lower end, as exemplified in U. S. Patent No. 2,526,875 to Jouannet, and U. S. Patent No. 2,526,876 to Sejersted. Such inverted channel arrangements have the disadvantage of requiring rather cumbersome manipulative equipment in order to accomplish periodic replenishment of the alumina content of the melt. Moreover, such arrangements have not proven completely satisfactory in practice because of difficulties encountered in continuously maintaining a gas-tight seal.

In self-baking anodes of the so-called horizontal stud type, such as disclosed in U. S. Patent No. 2,169,563 to Legeron, the fact that the bottom row of contact studs, as employed in this latter type of furnace, must closely approach the surface of the cryolite melt precludes the use of inverted channel gas collecting structures as are employed with the vertical stud type anode. Moreover, any attempt to raise the contact studs to a level that would permit the installation of a channel-shaped gas collecting ring surrounding the anode would so increase the electrical resistance through the lower section of the anode as to render operation of the furnace inefficient and uneconomical. This feature of the horizontal stud type of furnace has led to the adoption of hoods and covers which completely enclose the outside of the furnace, as disclosed in the aforementioned Legeron patent, and, aside from being unwieldy and cumbersome, such hooding arrangements have proven inefficient and undesirable since frequent removal for routine servicing of the furnace is necessary.

It is an object of this invention to present an improved arrangement of self-baking anode and anode gas collection means.

It is a further object of this invention to present an improved self-baking anode and gas collection arrangement which will obviate the necessity for providing confining hoods or gas collecting channels on the sides and ends of reduction furnaces, to thereby enable the furnace operator to more readily observe and service said furnaces.

It is yet another object of this invention to present a self-baking anode adapted to greater uniformity in density and of improved electrical properties.

It is an additional object of this invention to present a mode of anode gas collection capable of utilization, in conjunction with horizontal stud type self-baking anodes having incorporated therewith means for collection of tar vapors generated during the baking of the anode paste, in such a manner as to utilize the heat content of the anode gases in materially aiding in the subsequent disposition of the tar vapors.

The foregoing and other objects of this invention will be apparent from the description of the invention as hereinafter set forth.

The invention essentially comprises a method of and apparatus for collection of the anode gases by use of an anode gas collection zone or chamber arranged interiorly of the anode. The invention further contemplates construction of the anode gas collecting zone or chamber so as to provide a dividing vane in the upper portion of said chamber to impart to the anode paste, during the baking operation, a more uniform density and improved electrical conducting characteristics. It is a further advantage of this invention that the anode gas collecting zone or chamber arranged interiorly of the anode may be constructed to allow simultaneous withdrawal of tar vapors generated from the baking portion of the anode in an enclosed zone thereabove.

In order to illustrate specific examples of apparatus for practice of the invention, reference is made to the accompanying drawings which are somewhat schematic in character and partly in section, certain details of the furnace structure known to the art having been omitted for the sake of clarity of illustration.

Figure 1:
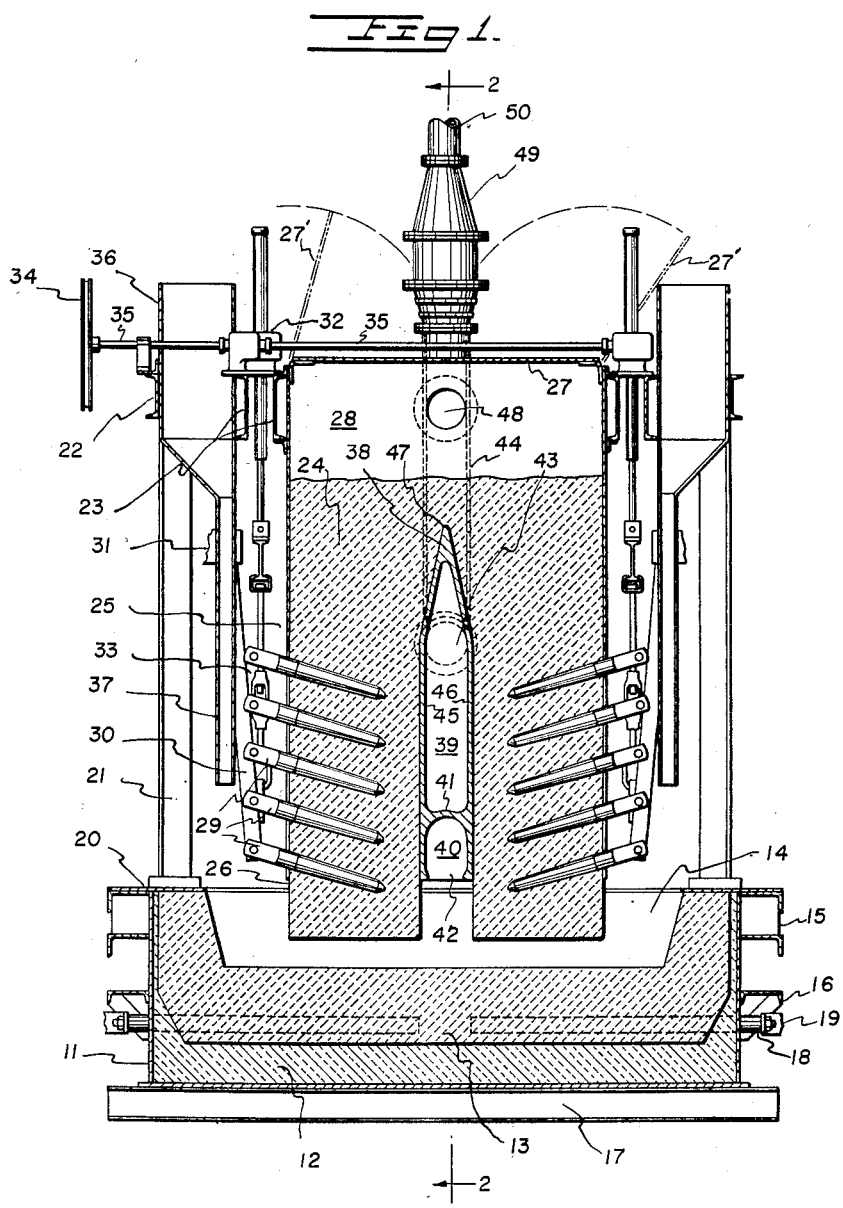
Figure 1 is an end elevational cross-section view of an aluminum reduction furnace illustrating application of the invention to a furnace utilizing the so-called horizontal stud type anode, the section through the anode and cathode thereof being taken along line 1—1 of Figure 2.
Figure 2:
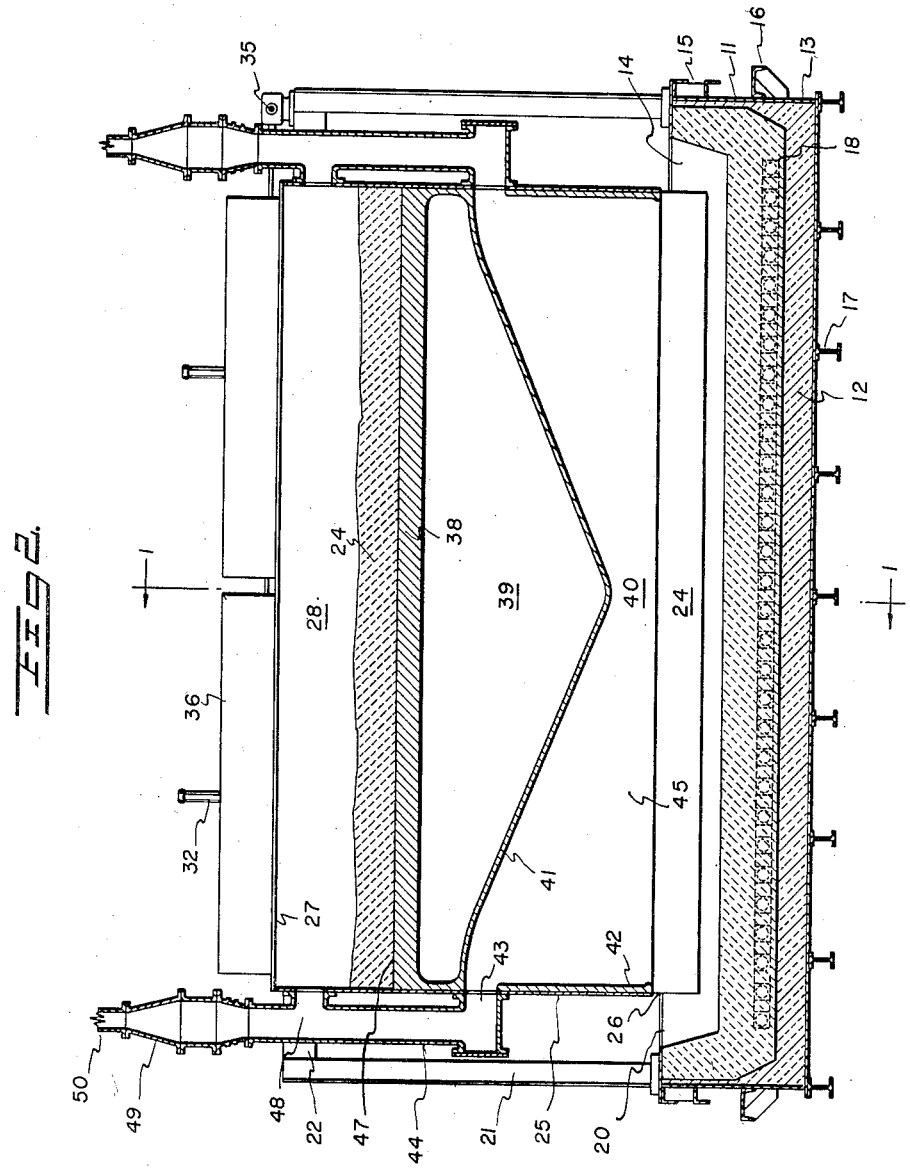
Figure 2 is a side elevational cross-section view of the aluminum reduction furnace shown in Figure 1, being taken along line 2—2 of said Figure 1.

Turning to a detailed consideration of the specific embodiment of the invention as applied to the so-called horizontal stud type self-baking anode and as illustrated in Figures 1 and 2, it is considered in order to first consider those features of furnace construction which are known to the art. In this connection, the aluminum reduction furnace illustrated in Figures 1 and 2 will be seen to comprise a cathode shell 11, having an interior lining 12 of heat insulating material, which in turn surrounds or encloses a second lining 13 of baked carbon. This second or inner lining 13 forms the cathode cavity 14, which is adapted in a conventional manner to receive the fused cryolite melt and the alumina used in the reduction process. The cathode shell 11 is usually of rectangular configuration and of relatively shallow depth, suitably reinforced, as indicated by angles and channels 15 and 16, respectively, and mounted or supported on transverse beams 17, substantially as indicated.

Current collector bars 18, embedded in the carbon lining 13, are uniformly spaced in two parallel, coplanar, horizontal, longitudinal rows, the confronting bars of each row being generally coaxial and symmetrical about a median line longitudinal to the shell 11, the inner ends thereof being spaced apart while their outer ends extend through the shell 11 and electrically connected to a cathode bus bar system, fragmentarily indicated at 19, in a manner well known to the art.

The rim of the carbon lining 13 has superimposed thereon a plate 20 forming a base for upstanding columns 21, one of these columns being mounted at each of the four corners of the cathode shell 11. Suitable cross members, such as channels 22 and 23, comprise part of the superstructure from which is suspended the continuous anode 24 and its associated mechanism. The anode casing 25 may be of plain construction, as shown, or may comprise channels bolted together in the conventional manner, as disclosed in the aforementioned Legeron patent. In either event, the anode casing 25 is of generally rectangular, box-like form, having an open bottom 26 to accommodate downward movement of the anode 24. The upper portions of anode casing 25, in conjunction with hinged covers 27, shown in open position by dotted line as indicated at 27', form a tar vapor collection chamber or enclosed zone 28 when said covers 27 are in normal closed position.

A plurality of rows of contact studs 29 protrude through the anode casing 25, having been inserted in both sides of the casing in a conventional manner and extending into the interior of the anode 24. Contact studs 29 in the lower portion of anode 24 are firmly held in place by the baking and subsequent solidification of carbon paste forming anode 24, which paste is introduced into the anode casing 25 at the upper end thereof. As the baking of this paste proceeds upwardly through the anode 24, the bottom rows of contact studs 29 are securely and positively baked in position. The lowermost row of contact studs 29 is normally electrically connected at the outer extremities of said contact studs 29, by means of flexible connections 30, to an anode bus system 31, fragmentarily shown, which is located on both sides of the continuous anode 24.

The entire anode assembly depends from superstructure channels 22 and 23 in vertical concentric alignment with the cathode shell 11, and is adjustably suspended, being adapted to downward and retractive movement along a vertical axis. Support and vertical adjustment for the anode assembly is provided for in the illustrative embodiment shown in Figures 1 and 2 by means of geared jacking devices 32 and associated suspension means, indicated generally at 33. The jacking devices 32 are located generally as indicated and are adapted to simultaneous control by the rotation of an operatively connected wheel 34 and shafts 35. The suspension means 33, depending from the jacking devices 32, are secured to the outer ends of a number of the lower contact studs 29. Alumina feeding bins 36, having a plurality of discharge spouts 37, are mounted on both sides of the anode 24, and serve the purpose of periodically replenishing the supply of alumina to the fused cryolite melt, not shown, contained in cathode cavity 14.

The foregoing constructional features of the furnace illustrated in Figures 1 and 2 are generally well known in the art. With these general features in view, reference now shall be made to the improved features brought about by this invention and the manner in which such improved features are associated with the structural arrangement previously related.

These improvements in anode 24 and its associated structure take the form, in the embodiment shown, of a dividing vane 38 interposed between the longer sides of the anode casing 25, and preferably being located equidistant from each side of anode casing 25 and parallel thereto, as illustrated. The dividing vane 38 may be of hollow construction, as indicated at 39, and incorporates an anode gas collecting chamber 40 at its lower end, said chamber 40 preferably leading upwardly, as indicated at wall 41, which, in the embodiment as disclosed in Figure 2, extends toward each end of the anode casing 25 and has end walls 42 adjacent thereto. Although not limited to this specific form, the chamber 40 is preferably constructed, as indicated, with an upper wall 41 of progressively increasing height relative to the lower edge of the chamber 40 as it extends outwardly toward the ends 42 of the chamber 40, in order to give structural rigidity to the unit as a whole, and in order to also ensure a more uniform flow for withdrawal of the anode gases.

In the upper portion of the ends 42 of chamber 40 an aperture 43 is provided for communication with a conduit 44. The side walls 45 and 46 of the vane 38 extend upwardly from the edge of the chamber 40, which edge is located a relatively short distance above the fused cryolite melt, not shown, and in parallel relationship through the baked portion of anode 24 into the unbaked portion thereof, at which point said side walls 45 and 46 converge upwardly to form a tapered rib having a relatively thin upper edge 47 adapted to divide the carbon paste, and thus form a continuous anode 24 having a vertical transverse section of bifurcated formation, as shown.

The enclosed tar vapor collecting chamber 28 between the upper surface of the anode 24, the upper portions of anode casing 25 and the underside of the covers 27, is provided with apertures 48 in the end walls of the anode casing 25 which also communicate with the conduits 44.

As a consequence of withdrawal of the anode gases and tar vapors through conduits 44, the co-mingled anode and tar vapor gases may be further treated, as by combustion in burners 49, and the withdrawn gases or the products of combustion may be further removed through conduits, fragmentarily shown at 50, by conventional exhaust blower means, not shown, and by detoxication and/or recovery of fluorine-containing values as desired, by methods well known to the art.

Figure 3:
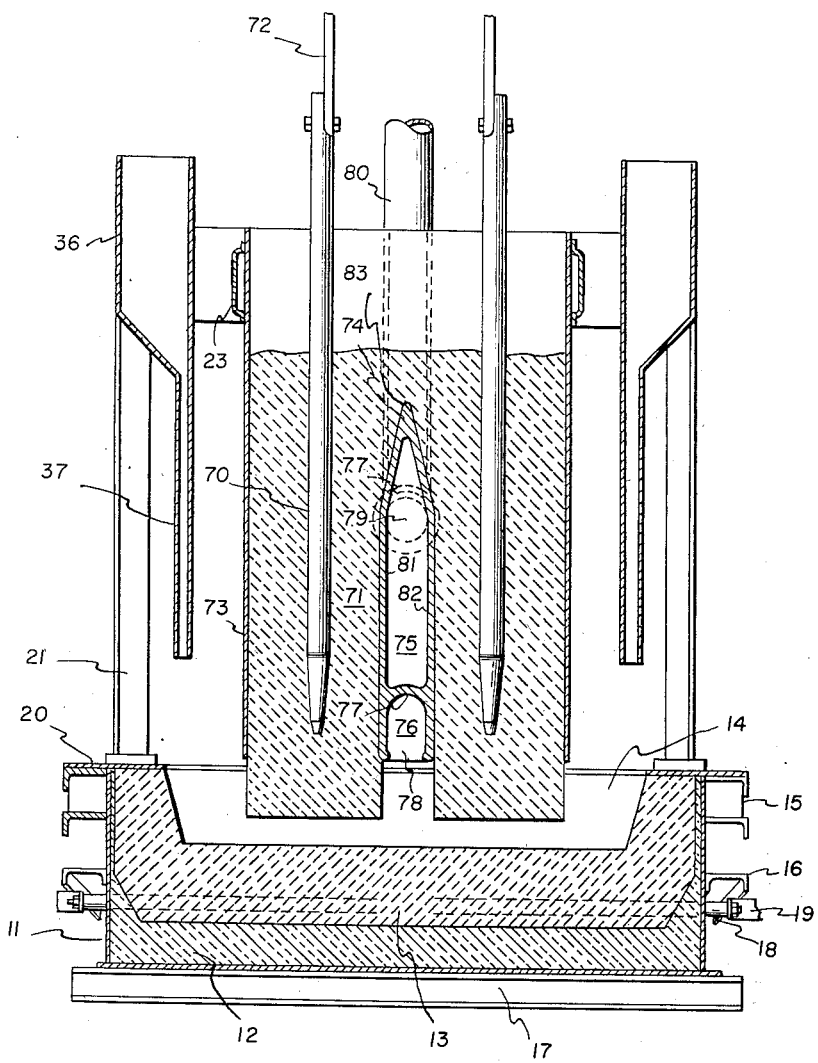
Figure 3 is an end elevational cross-section view of an aluminum reduction furnace utilizing an anode gas collection chamber in accordance with this invention, which aluminum reduction furnace utilizes a continuous anode having vertically arranged contact studs, the section shown having been taken through the central section of the anode and cathode.

A further embodiment of this invention, shown in Figure 3, illustrates an arrangement wherein the anode gas collection chamber and its associated equipment is used in conjunction with a vertically arranged contact type self-baking anode. In said Figure 3, conventional constructional details of the electric furnace illustrated therein which correspond with conventional constructional details described in connection with Figures 1 and 2 have been given like designating numerals.

In the vertical contact stud type of self-baking anode assembly embodying the present invention, it will be understood that a plurality of vertical contact studs 70, by conventional operation of this type of electrical furnace, are baked in the self-baking anode 71 and serve to support said anode 71 by virtue of conventional jacking mechanisms, not shown, associated with vertical contact studs 70. Vertical contact studs 70 are further provided with electric current carrying members, fragmentarily shown at 72. The self-baking anode 71 is surrounded by a suitable anode casing 73, which is conventionally of rectangular configuration.

In accordance with the improvements contemplated by the present invention, the anode assembly shown in Figure 3 is provided with a dividing vane 74 interposed between the longitudinally extending sides of the anode casing 73, said dividing vane 74 preferably being located equidistant from each longitudinal side of anode casing 73 and parallel thereto, as shown in cross section. The dividing vane 74 may be of hollow construction, as indicated at 75, and incorporates an anode gas collecting chamber 76, said chamber 76 having an upper wall 77 and suitable end walls, one of such end walls being shown at 78. It will be apparent that upper wall 77 of chamber 76 is of progressively increasing height toward the ends thereof relative to the lower edge of the chamber 76 in a manner corresponding to the configuration of upper wall 41, as shown in Figure 2, in order to impart structural rigidity to the unit as a whole, and in order to also ensure more uniform flow for withdrawal of the anode gases.

The upper portion of end wall 78 of anode gas collecting chamber 76, in the arrangement shown in Figure 3, is provided with an aperture 79 in communication with a conduit 80, to accommodate removal of the anode gases collected in said chamber 76 and ultimate delivery thereof to a suitable fume control system.

The side walls 81 and 82 of dividing vane 74 extend upwardly from the lower edge of the chamber 76, which edge is located a relatively short distance above the fused cryolite melt, not shown, and in parallel relation through the baked portion of the anode 71, into the unbaked portion thereof, at which point said side walls 81 and 82 converge upwardly to form a tapered rib having a relatively thin upper edge 83 adapted to divide the carbon paste introduced to the upper portion of the anode, and thus form a self-baking anode 71 having a vertical transverse section of bifurcated formation.

Although the vertical contact stud type self-baking anode, as illustrated in Figure 3, does not embody a closed chamber above the baking portion of the self-baking anode 71, it will be apparent that closure members associated with the upper portions of anode casing 73 and capable of allowing periodic introduction of carbon paste and in adjustable surrounding relation with respect to vertical contact studs 70, may be provided for use in conjunction with the self-baking anode assembly shown in Figure 3. Such closure members and anode casing 73 may thereby serve to form a collection chamber above the unbaked portion of continuous anode 71, in a manner similar to hinged covers 27 and associated anode casing 25 in the embodiment illustrated in Figures 1 and 2.

Figure 4:
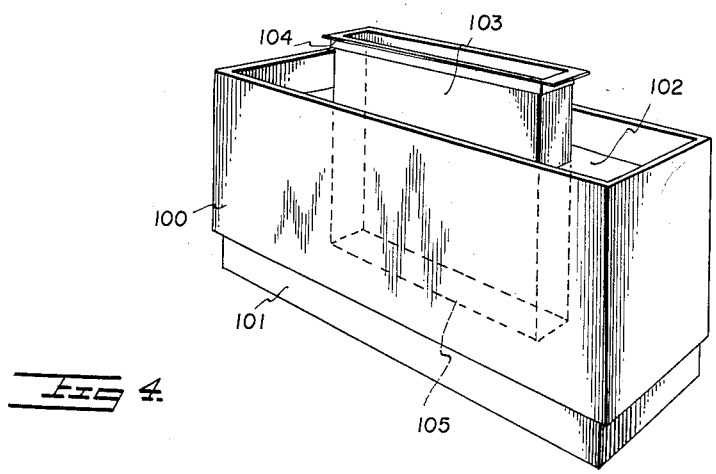
Figure 4 is a perspective view of a modified form of anode casing and gas collection chamber wherein the gas collection chamber is entirely surrounded by the continuous anode.

A further modification of the present invention, as illustrated in simplified perspective in Figure 4, exemplifies a different arrangement of anode casing and anode gas collection chamber. This modification, as illustrated, utilizes an anode casing 100 in surrounding relation with respect to the self-baking anode 101, the unbaked portion of which is shown at 102. Said anode 101 in turn surrounds an anode gas collecting chamber 103 which is supported, as by flange means 104, in position to maintain the lower edge 105 of said gas collecting chamber 103 adjacent to and somewhat above the fused cryolite melt, not shown. As will be apparent, the modified arrangement illustrated in Figure 4 may be used in conjunction with self-baking anodes employing horizontal type contact studs, as well as self-baking anodes employing vertical contact studs, and may be adapted to oblong configurations of anode casing and anode gas collecting chamber for anodes of oblong design. It will be further apparent that said modification as illustrated in Figure 4 is susceptible of use for separate or common collection and withdrawal of anode gases and tar vapors, as desired.

Figure 5:
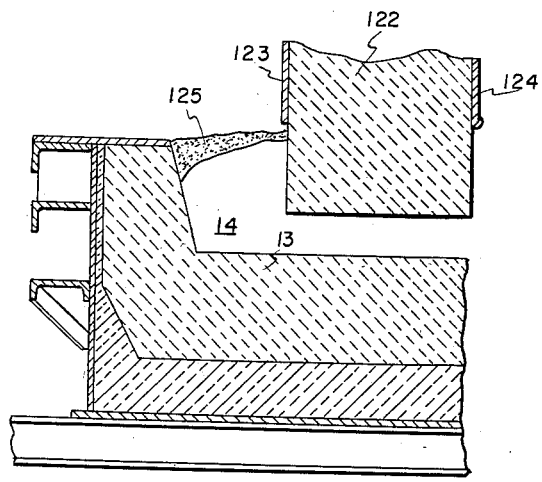
Figure 5 is a typical fragmentary cross-section view of the embodiments illustrated in Figures 1 and 3, showing the use of frozen cryolite and alumina solidified from or being delivered to the melt as an effective gas seal exteriorly of the self-baking anode.

Reference is now made to Figure 5, which serves to illustrate the preferred mode of operation of any of the types of furnaces illustrated in order that an effective gas seal may be maintained exteriorly of the continuous anode. In this fragmentary cross-sectional view, the fused cryolite melt, not shown, is maintained in cavity 14 of cathode 13 in operative association with continuous anode 122, its associated anode casing 123 and anode gas collection chamber wall 124. During proper operation of the furnace, a crust 125 composed of frozen cryolite and powdered alumina solidified from or being delivered to the melt is formed, which crust 125 serves as an insulating blanket in the normal operation of the furnace. As seen in Figure 5, this crust 125 forms an effective gas seal to prevent the escape of generated anode gases around the outside of the anode 122. As a result of such gas seal, a negative pressure maintained in the gas collection zone or chamber by suitable gas withdrawal, as by exhaust blower means associated therewith, results in all of the anode gases being withdrawn interiorly of the continuous anode 122.

It is a further feature of this invention that collection and withdrawal of anode gases interiorly of the self-baking anode is facilitated by placement of the inner ends of the horizontal contact studs or the lower ends of the vertical contact studs, as the case may be, in baked position to some extent relatively closer to the vertical walls of the anode gas collection chamber than the opposing anode casing. By such positioning, operation of the electric furnace results in a somewhat upwardly and inwardly sloping lower anode surface as at 126, in Fig. 6, which illustrates this structure, because of the relatively lower resistance path for current flow available immediately adjacent the lowermost portion of the content stud. By such upwardly and inwardly sloping lower anode surface, gas flow to the central portion of the anode is facilitated and more efficient gas collection interiorly of the anode is accomplished. In accordance with this concept, the preferred positioning of the horizontal contact studs is substantially as shown in Figure 1 and the preferred positioning of the vertical contact studs is substantially as shown in Figure 3, it being understood, however, that the lowermost portion of the contact studs may be placed in median position between the outer anode casing and the gas collection chamber, if desired.

From the foregoing description, it is considered that the construction and manner of use of the present invention will be readily understood by those skilled in the art. Modifications in constructional details and the utilization of various other design and operating principles known to the art may, of course, be utilized in the practice of the invention. In this connection, for example, use of thin aluminum sheet to alleviate sticking of the anode and its associated casing is well known, and such principle may be employed in a manner obvious to those skilled in the art in the event sticking of the baked carbon to the dividing vane or anode casing is encountered. Further, it will be apparent to those skilled in the art that gas collection chamber arrangements other than the dividing vane illustrated in Figures 1 to 3 and the chamber arrangement shown in Figure 4, are available to accomplish the purpose of removal of anode gases interiorly of the self-baking anode. It will also be readily understood that the invention, although specifically disclosed as applied to collection of gases generated incidental to the operation of various aluminum reduction furnaces, is adaptable for use and has applicability in other types of electric furnaces utilizing continuous electrodes, such as furnaces for production of calcium carbide and ferro-alloy melting furnaces, for example.

What is claimed is:

1. An electric furnace comprising a cathode shell adapted to receive a melt, an anode casing, a self-baking anode in said casing and arranged in operative relation with said cathode shell and a dividing vane in fixed relation with said anode casing and extending vertically through the baked portion of said self-baking anode and converging to a relatively narrow upper edge in the unbaked portion of said self-baking anode, said vane serving to divide and laterally compress the anode paste during periodic downward movement and baking thereof to impart to said anode increased density and improved electrical characteristics.

2. An electric furnace as recited in claim 1 wherein said self-baking anode is of oblong horizontal cross-sectional configuration and said dividing vane extends longitudinally of said section.

3. An electric furnace comprising a cathode shell adapted to receive a melt, a self-baking anode arranged in operative relation with said cathode shell, a dividing vane extending upwardly through the baked portion of said self-baking anode and into the unbaked portion of said anode, said dividing vane having an opening on the underside thereof and having a relatively narrow upper edge serving to divide and laterally compress the anode paste during periodic downward movement and baking thereof to impart to said paste increased density and improved electrical characteristics, said dividing vane further serving in the under portion thereof as said anode gas collection chamber, and means for withdrawing gases from said chamber.

4. An electrical furnace self-baking anode dividing vane comprising upstanding, confronting walls, having opposed, substantially parallel lower portions and upwardly converging upper portions to form a narrow upper edge, said confronting walls being enclosed at their ends to form an open bottom gas collecting chamber and provided with apertures to allow withdrawal of anode gases from said chamber, an upper wall in said gas collection chamber relatively near the lower edge of said chamber in the central portion thereof and progressing increasingly upwardly toward said gas withdrawal apertures disposed at the ends of said chamber, said upper wall imparting structural rigidity to said vane and ensuring more uniform gas flow for withdrawal of anode gases through said apertures.

5. An anode assembly for use in an electric furnace, comprising an anode casing, a self-baking anode in said casing, a dividing vane disposed within said anode and extending the length of a diameter thereof and being provided with a downwardly diverging configuration in the unbaked portion of said anode to bifurcate said unbaked portion, said dividing vane having confronting parallel side walls and end walls in the lower portion thereof to form a gas collection chamber and gas removal apertures disposed in said end walls, and a wall dividing the upper portion of said vane from said lower gas collection chamber, said dividing wall being near the lower edge of said gas collection chamber in the central portion thereof and diverging upwardly toward said gas removal apertures to impart structural rigidity to said vane and provide more uniform flow of anode gases toward said apertures.

References Cited in the file of this patent

UNITED STATES PATENTS

| 1,640,735 | Soderberg | Aug. 30, 1927 |
| 1,837,070 | Roth | Dec. 15, 1931 |
| 2,631,972 | Luzzatto | Mar. 17, 1953 |

FOREIGN PATENTS

| 601,873 | Great Britain | May 13, 1948 |
| 762,812 | France | Jan. 29, 1934 |
| 45,694 | Norway | Oct. 15, 1928 |
| 1,035,887 | France | Apr. 22, 1953 |
| 103,782 | Australia | Apr. 20, 1938 |

UNITED STATES PATENT OFFICE
CERTIFICATE OF CORRECTION

Patent No. 2,822,328                                                    February 4, 1958

John Walker

It is hereby certified that error appears in the printed specification of the above numbered patent requiring correction and that the said Letters Patent should read as corrected below.

Column 6, line 57, for "portion of the content" read -- portion of the contact --.

Signed and sealed this 8th day of March 1960.

(SEAL)
Attest:

KARL H. AXLINE
Attesting Officer

ROBERT C. WATSON
Commissioner of Patents